United States Patent
Hagelis et al.

(10) Patent No.: US 11,738,684 B2
(45) Date of Patent: Aug. 29, 2023

(54) VEHICLE ALERT USING HAPTIC FEEDBACK

(71) Applicant: Motional AD LLC, Boston, MA (US)

(72) Inventors: Alexander Hagelis, Kingston, MA (US); Christopher Konopka, Peabody, MA (US); Tristan Dwyer, Stow, MA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/457,846

(22) Filed: Dec. 6, 2021

(65) Prior Publication Data

US 2023/0173979 A1 Jun. 8, 2023

(51) Int. Cl.
*G08G 1/0967* (2006.01)
*B60Q 9/00* (2006.01)
*G06V 20/58* (2022.01)

(52) U.S. Cl.
CPC .............. *B60Q 9/00* (2013.01); *G06V 20/58* (2022.01); *G08G 1/0967* (2013.01)

(58) Field of Classification Search
USPC .............. 340/905, 903, 902, 908, 925, 937, 340/935–936, 965, 990, 995.1, 429, 340/426.25, 426.31, 444
See application file for complete search history.

(56) References Cited

U.S. PATENT DOCUMENTS

| | | |
|---|---|---|
| 2007/0109104 A1 | 5/2007 | Altan et al. |
| 2013/0341977 A1 | 12/2013 | Kiefer et al. |
| 2013/0342339 A1 | 12/2013 | Kiefer et al. |
| 2016/0318442 A1 | 11/2016 | James |
| 2017/0291540 A1 | 10/2017 | Caveney et al. |
| 2018/0005528 A1* | 1/2018 | Loeillet .................. G08G 1/166 |
| 2019/0113927 A1* | 4/2019 | England ................. G06N 5/046 |
| 2019/0359128 A1* | 11/2019 | Harper .................. G08G 1/163 |
| 2020/0171397 A1* | 6/2020 | Krauthamer .......... A63G 25/00 |
| 2020/0334923 A1 | 10/2020 | Yamamoto et al. |
| 2021/0166558 A1* | 6/2021 | Giraud ................. G08G 1/0133 |
| 2021/0261135 A1* | 8/2021 | O'Flaherty ............ G08B 21/06 |

FOREIGN PATENT DOCUMENTS

GB 2587399 A 3/2021

OTHER PUBLICATIONS

Great Britain Office Action issued for Application No. GB 2201409.6, dated May 25, 2022.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

*Primary Examiner* — Daniel Previl
(74) *Attorney, Agent, or Firm* — Knobbe, Martens, Olson & Bear, LLP

(57) ABSTRACT

Provided are methods for activating haptic feedback sensors to identify a state of vehicle, which can include receiving sensor data associated with the vehicle, determining a vehicle alert for a passenger of the vehicle based at least in part on the sensor data associated with the vehicle, and activating at least one haptic feedback sensor based at least in part on the vehicle alert for the passenger. Systems and computer program products are also provided.

20 Claims, 9 Drawing Sheets

VEHICLE ALERT USING HAPTIC FEEDBACK

BACKGROUND

Self-driving vehicles typically use sensor data to perceive the area around them. Providing an indication of the sensor data to a user of the vehicle can be difficult and complicated.

DETAILED DESCRIPTION

Figure 1:
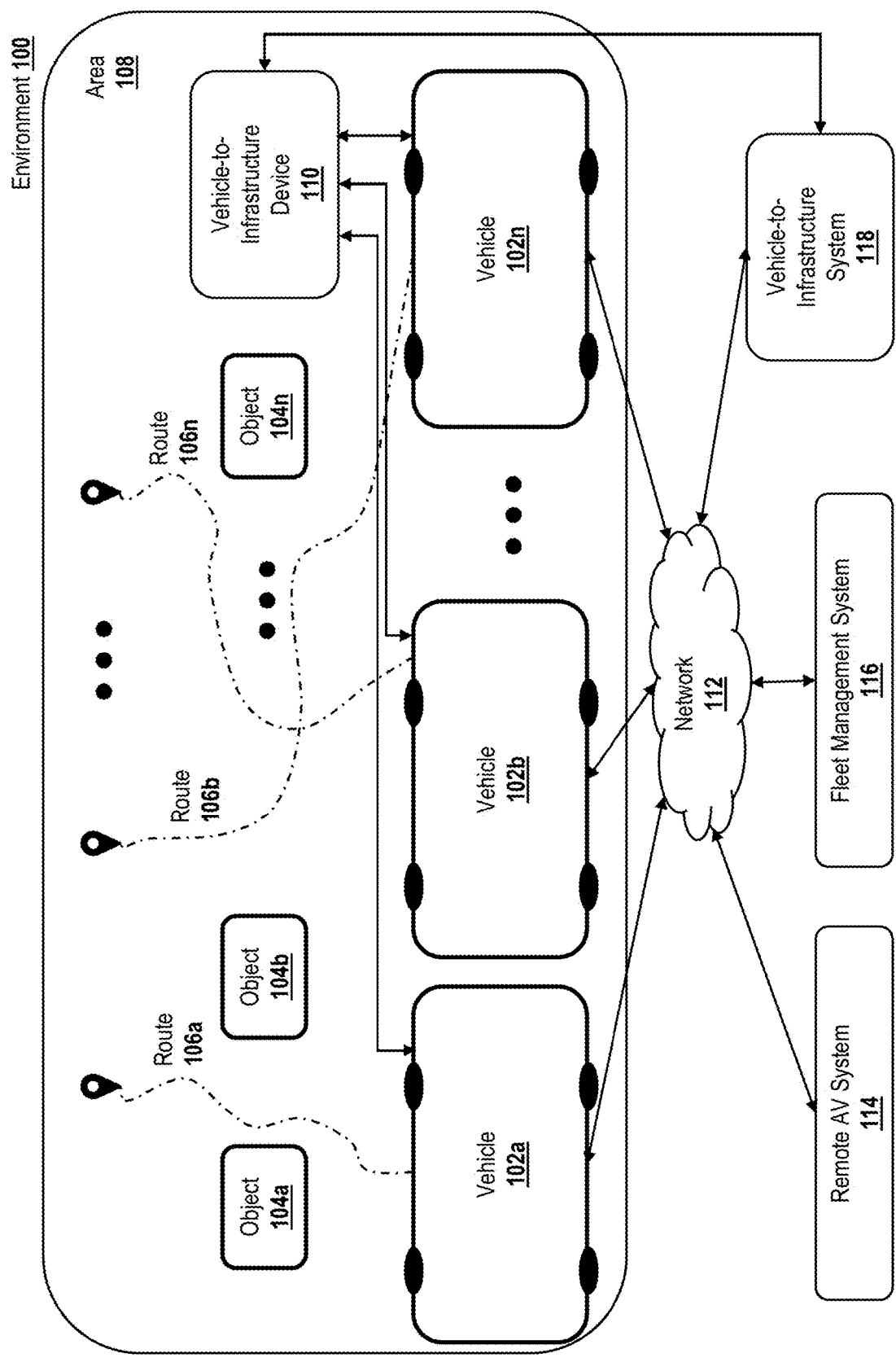
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event],"

"in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a situational awareness system that obtains sensor data, determines a vehicle alert based on the sensor data, and activates at least one haptic feedback sensor based on the vehicle alert. The situational awareness system can receive sensor data to identify particular features based on the sensor data. For example, the situational awareness system can receive sensor data to identify objects in an image of an area based on the sensor data. Further, the situational awareness system can receive sensor data to identify a state of a sensor, component, system, etc. For example, the situational awareness system can identify a state of the vehicle and/or a state of a particular component of the vehicle. The situational awareness system can determine a vehicle alert that is associated with the particular sensor data and activate at least one haptic feedback sensor based on the vehicle alert. As a non-limiting example, the signal processing system can activate haptic feedback sensor based on sensor data of a vehicle by receiving sensor data associated with the vehicle, determining a vehicle alert for a passenger of the vehicle based on the sensor data associated with the vehicle, and activating at least one haptic feedback sensor based on the vehicle alert for the passenger.

By virtue of the implementation of systems, methods, and computer program products described herein, a system can provide haptic feedback that identifies sensor data of the vehicle within a particular environment and provide personalized feedback for a given passenger. For example, the system may be able to determine environmental data, directional data, landmark data, object data, vehicle state data, vehicle status data, etc. from the sensor data and use the determined data to provide feedback for a passenger. Further, the system can more efficiently provide feedback to passengers with sensory disabilities who may be unable to fully see the environment around them. By providing haptic feedback that identifies sensor data of the vehicle, the system can provide indications of the sensor data of the vehicle to passengers who not may be able to fully capture the environment corresponding to the sensor data. For example, the haptic feedback can indicate that the vehicle is approaching a destination, a location of a curb or obstacle relative to the vehicle, etc. The haptic feedback can increase the safety of the vehicle for passengers with sensory disabilities and may enable the passengers to avoid potential dangerous conditions based on the haptic feedback. For example, the haptic feedback may indicate that another vehicle is passing the vehicle when a passenger is attempting to exit the vehicle. Further, the system can provide haptic feedback that is personalized or customized for each passenger. For example, the system can identify locations of passengers within the vehicle and types of passengers within the vehicle and the haptic feedback can be customized based on the location and type of passengers. Such a customized haptic feedback can improve the quality and efficiency of the system. Additionally, such customized haptic feedback can increase the safety associated with the vehicle. For example, the system may be able to identify potential obstacles and provide an indication of these obstacles to passengers who may be unable to see the obstacles.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
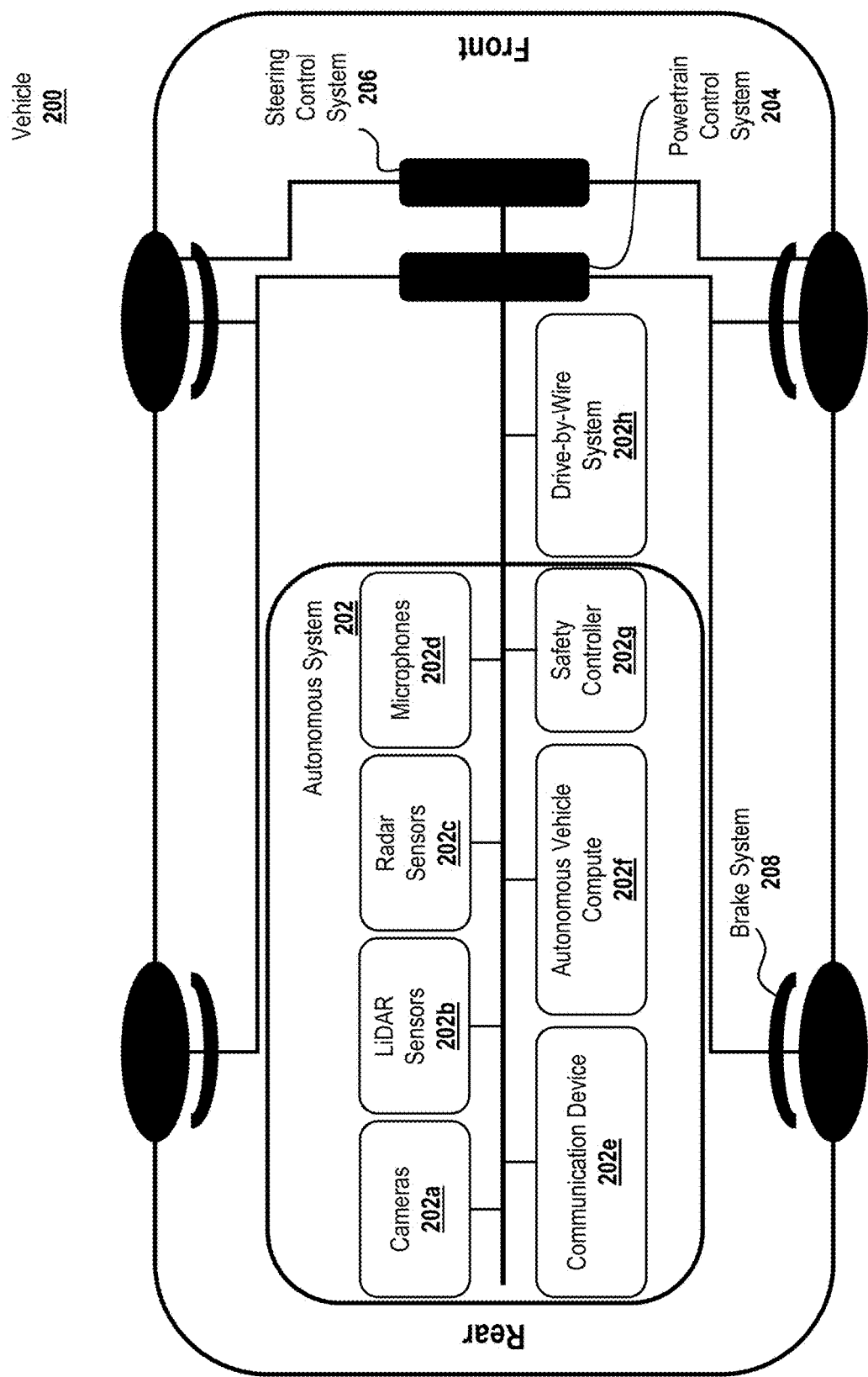
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
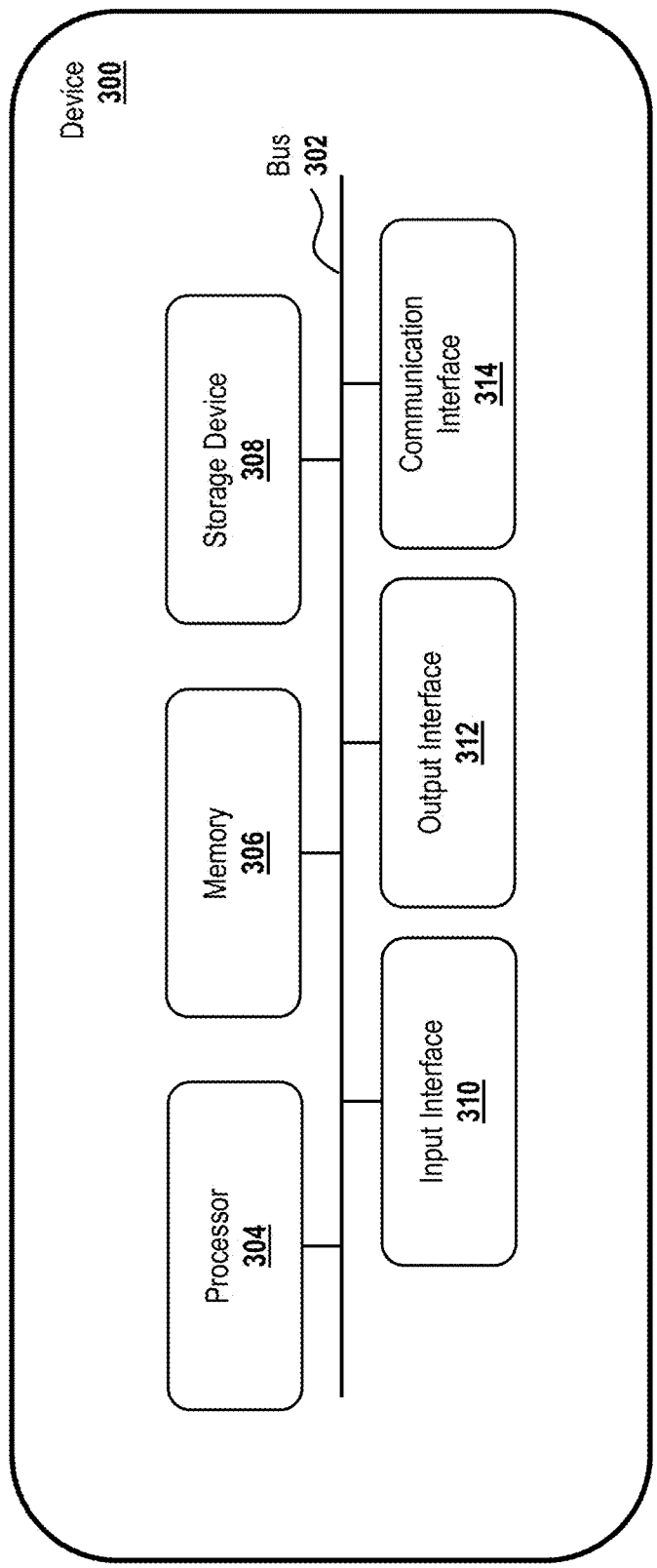
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4:
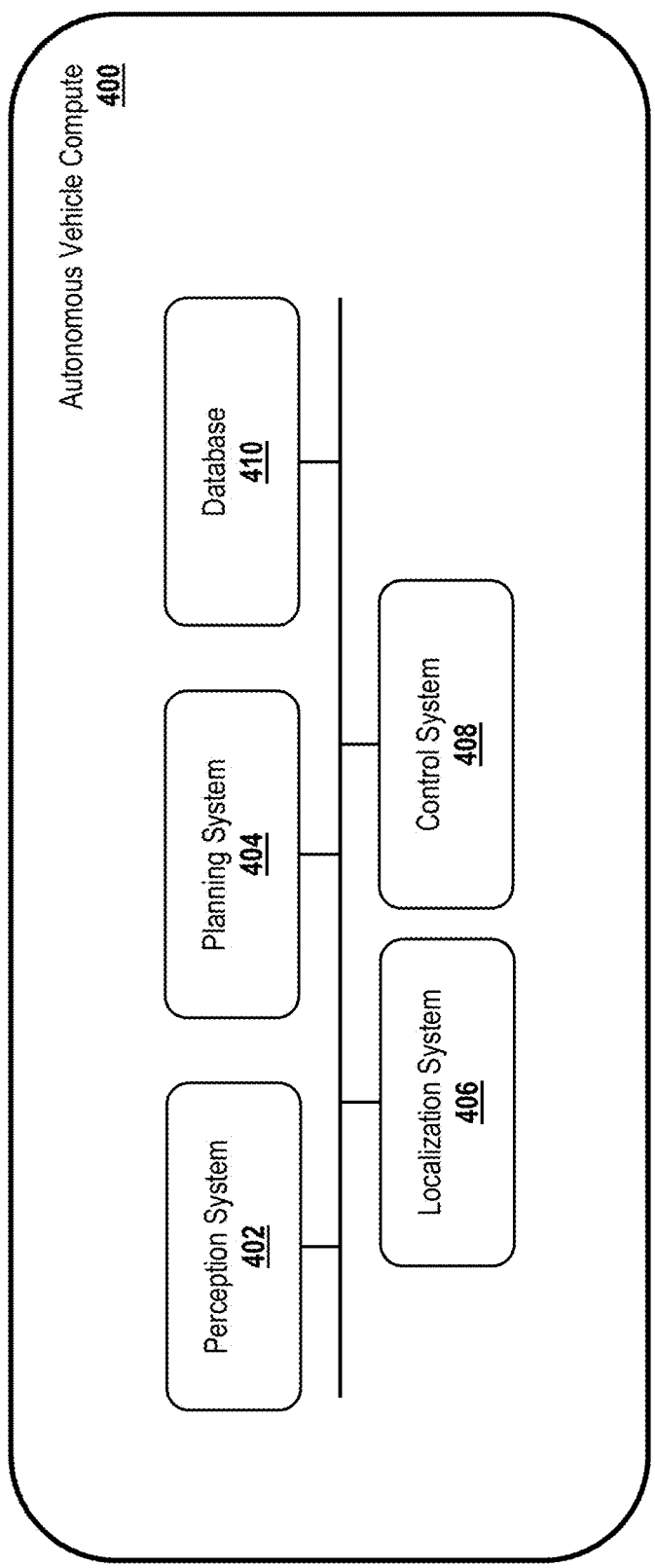
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Activating Haptic Feedback Sensors Based on Sensor Data

As a vehicle (e.g., an autonomous vehicle) moves through an area, the vehicle may encounter a number of different objects within an area (e.g., an area inside or outside of a vehicle). In order to identify the objects, the vehicle can capture sensor data associated with at least one sensor. The sensors can include any one or any combination of radar sensors, lidar sensors, cameras, etc. The vehicle can process the captured sensor data to obtain environmental data associated with an environment of the vehicle and. Based on the environmental data, the vehicle can navigate the environment and potential obstacles within the environment that are captured by the sensor data. For example, the vehicle can include a navigational system to assist in navigation based on the environmental data.

In some cases, the vehicle can include a system to receive the sensor data and provide a visual indication and/or audible indication of the environmental data based on the sensor data to the passengers to provide an improved riding experience. For example, the vehicle may include a visual dashboard to display the visual indication of the environmental data and/or may include a speaker to output an audible indication of the environmental data.

In some cases, visual indications and/or audible indications may not be appropriate for each passenger. For example, a passenger with a visual disability may be unable to decipher a visual indication of the environmental data. The inability to decipher the indication of the environmental data may produce adverse effects. For example, the environmental data may indicate the location of a potential obstacle when exiting the vehicle and, without separate knowledge of the obstacle, a visually impaired passenger may be injured when encountering the obstacle.

Further, when providing limited types of indications of environmental data, a system may be unable to provide helpful vehicle alerts to a passenger quickly and/or accurately. This can also lead to an inadequate user experience as the system may be limited to providing indications of environmental data for a limited subset of potential passengers.

To address these issues, a situational awareness system can use various types of feedback sensors and/or customized indications of environmental data. In some cases, the system can include haptic feedback sensors to provide vehicle alerts based on sensor data. For example, for a visually impaired passenger, the system can provide a vehicle alert using a haptic feedback sensor.

As passengers with different preferences and/or sensory impairments may utilize the vehicle, the system can customize the feedback sensors used and the vehicle alerts for different customers. In some cases, the situational awareness system can customize the haptic feedback provided via the haptic feedback sensors for particular passengers to provide a customized response for the user. The situational awareness system can identify a first mapping of the sensor data (or the environmental data) to a particular vehicle alert and a second mapping of the vehicle alert to alert data (for activating the haptic feedback sensor. In some embodiments, the situational awareness system can identify one of the first mapping or the second mapping. Further, the situational awareness system can identify an overall mapping of the sensor data (or the environmental data) to alert data. Such mappings of the sensor data to a vehicle alert to alert data can increase the customization of the haptic feedback.

By customizing the haptic feedback for particular passengers (instead of providing generic, static, or fixed indications of sensor data), the situational awareness system can increase the likelihood that a passenger understands the vehicle alert. Further, the situational awareness system can increase the likelihood that passengers receive accurate and reliable indications of the sensor data. Further, the situational awareness system may also determine customizations of the haptic feedback for different passengers within a vehicle. Such a customization of the haptic feedback can increase the effectiveness and efficiency of the situational awareness system.

As described herein, the situational awareness system can obtain sensor data associated with the vehicle. The sensor data can include, but is not limited to, image data associated with one or more images inside or outside of the vehicle (e.g., lidar data associated with a lidar sensor, radar data associated with a radar sensor, camera image data associated with a camera image), seatbelt data associated with a seatbelt sensor, windshield wiper data associated with a windshield wiper sensor, light sensor data associated with a light sensor, speedometer data or velocity sensor data associated with a velocity sensor, engine sensor data associated with an engine sensor, acceleration data associated with an accelerometer, orientation data associated with a gyroscope, location data associated with a geographic location sensor, etc.

Based on the obtained sensor data, the situational awareness system may identify environmental data associated with the environment of the vehicle. The environmental data can include data associated with the external or internal environment of the vehicle. For example, based on location sensor data associated with a location sensor of the vehicle, the situational awareness system may identify weather data associated with the weather at that location. As another example of environmental data, using image sensor data associated with an image sensor (e.g., a lidar image sensor, a radar image sensor, a camera image sensor, etc.) the situational awareness system may identify landmark data associated with a landmark in the environment of the vehicle based on the obtained sensor data. For example, the situational awareness system may identify a location of an obstacle, a destination, another vehicle, a human, etc. relative to the location of the vehicle.

Further, the environmental data may include vehicle state data associated with a state of the vehicle or a vehicle component. For example, the situational awareness system may identify a status of one or more components of the vehicle (e.g., seatbelt buckle, windshield wipers, lights, speedometer, engine, velocity, acceleration, orientation, etc.) based on one or more sensors associated with the vehicle or the one or more components of the vehicle (e.g., seatbelt buckle sensor, windshield wiper sensor, light sensor, speedometer or velocity sensor, engine sensor, accelerometer, gyroscope, etc.).

Using the sensor data and/or the environmental data associated with the environment of the vehicle, the situational awareness system can determine a vehicle alert mapped to the sensor data and/or the environmental data using first mapping data. In some embodiments, different subsets of sensor data and/or environmental data can be mapped to different vehicle alerts. For example, vehicle state data associated with a status of lights of the vehicle and landmark data associated with an obstacle in the environment of the vehicle may be mapped to different vehicle alerts. Moreover, the vehicle alert can vary depending on the type of landmark data. For example, different vehicle alerts can be used depending on whether the landmark data identifies a passenger's destination or obstacle for the passenger, a pedestrian, or a passing vehicle, etc. Accordingly, based on the sensor data and/or environmental data, the situational awareness system can identify a vehicle alert.

In some cases, the situational awareness system can use customized vehicle alerts for different passengers. The vehicle alert for a particular passenger can be based on passenger data associated with the passenger. For example, a passenger, via a user computing device, can provide data indicating a particular vehicle alert (and/or particular haptic feedback sensors or patterns) for particular sensor data and/or environmental data.

The situational awareness system can customize vehicle alerts based on a location and/or type of passenger. The situational awareness system may include one or more sensors (e.g., pressure sensors) and based on output from the one or more sensors, the situational awareness system may determine a location and/or type of each passenger in the vehicle. Further, the situational awareness system may identify a vehicle alert based on the location and/or type of passenger. For example, the situational awareness system may identify a vehicle alert that is associated with the location of the passenger and based on the type of the passenger (e.g., the situational awareness system may identify different vehicle alerts for a human passenger or an animal passenger and/or may not identify a vehicle alert for an inanimate object).

Based on the vehicle alert, the situational awareness system can provide feedback to a passenger. In some cases, the situational awareness system can use one or more haptic feedback sensors to provide feedback to the passenger. The haptic feedback sensors can be located throughout the vehicle (e.g., a seat of the vehicle, an armrest of the vehicle, a floorboard of the vehicle, etc.). The situational awareness system can identify the one or more haptic feedback sensors to provide the feedback by identifying a mapping of the one or more haptic feedback sensors to the vehicle alert using second mapping data. The mapping data for mapping the sensor data and/or environmental data to the vehicle alert may be the same or different from the mapping data for mapping the vehicle alert to the one or more haptic feedback sensors. In some cases, the system can utilize haptic feedback sensors located in a computing device of the passenger to provide feedback to the passenger. For example, the system can use haptic feedback sensors located in a mobile phone associated with the passenger. Each vehicle alert may be mapped to a particular combination or subset of the plurality of haptic feedback sensors. For example, the situational awareness system may select a particular mapping or combination of feedback sensors to convey the vehicle alert to the user from a plurality of potential mappings of vehicle alerts to subsets of the plurality of haptic feedback sensors.

The situational awareness system may activate the one or more haptic feedback sensors based on the mapping of the one or more haptic feedback sensors to the vehicle alert. Further, the situational awareness system may activate the one or more haptic feedback sensors in a predefined pattern (e.g., based on the vehicle alert).

Further, the situational awareness system may also provide a visual and/or audible indication of the sensor data. For example, the vehicle alert may be mapped to the one or more haptic feedback sensors, a visual indication of the sensor data, and/or an audible indication of the sensor data. The situational awareness system may cause output of the visual indication and/or the audible indication of the sensor data with the activation of the one or more haptic feedback sensors to provide multiple indications of the sensor data.

Figure 5:
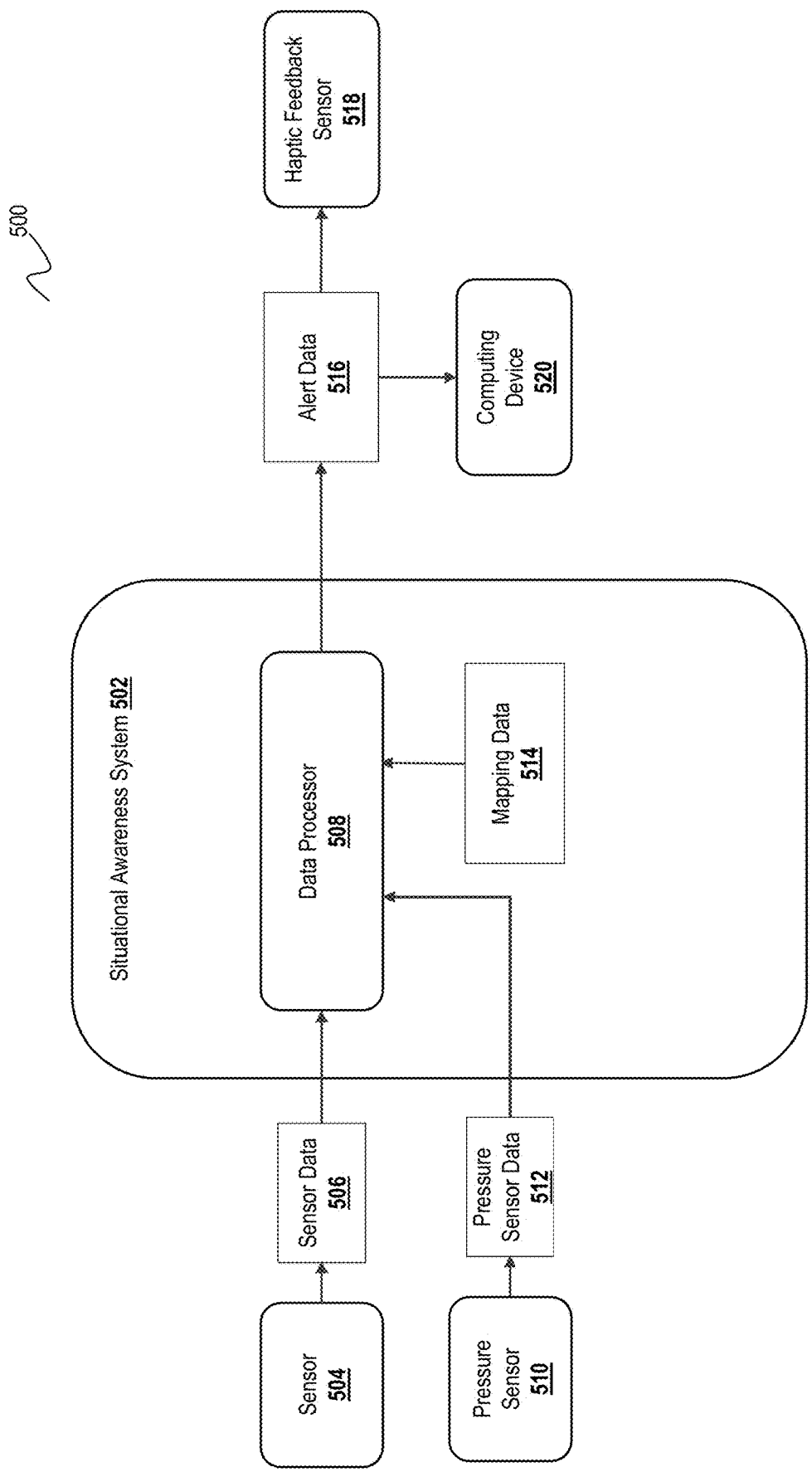
FIG. 5 is a block diagram illustrating an example of a situational awareness system.

FIG. 5 is a block diagram illustrating an example of a signal processing environment 500. In the illustrated example, the signal processing environment 500 includes a situational awareness system 502 communicatively coupled with a sensor 504, a pressure sensor 510, a computing device 520, and a haptic feedback sensor 518. In some cases, the signal processing environment 500 and/or the situational awareness system 502 can form at least a part of the perception system 402, described herein at least with reference to FIG. 4. The situational awareness system 502 can receive sensor data 506 associated with the sensor 504, and use the sensor data 506 to determine alert data 516 associated with a vehicle alert. In some cases, the system 502 can use mapping data 514 associated with a mapping of sensor data (and/or environmental data) to alert data 516 to determine which vehicle alerts to activate based on incoming sensor data 506.

The sensor 504 generates sensor data 506 and communicates the sensor data 506 to the situational awareness system 502. The sensor 504 can include any one or any combination of a camera 202*a*, LiDAR sensor 202*b*, radar sensor 202*c*, etc., similar to that described above with reference to FIG. 2. Further, the sensor 504 can include a pressure sensor, a weight sensor, a proximity sensor, location sensor (e.g., GPS sensor), an edge sensor, an accelerometer, or a gyroscope. In some embodiments, the sensor 504 may include a plurality of sensors (e.g., a plurality of different sensors) that may each provide sensor data 506 to the situational awareness system 502. Similarly, the sensor data 506 can include different types of sensor data, such as camera data associated with a camera image, radar data associated with a radar image, LiDAR data associated with a point cloud, pressure data associated with a pressure, weight data associated with a weight, proximity data associated with a spatial proximity, edge data associated with discontinuities (e.g., discontinuities in brightness), acceleration data associated with a rate of change of the velocity of sensor, velocity data associated with a velocity of a sensor, orientation data associated with an orientation of a sensor, location data (e.g., GPS data) associated with a geographic location, etc. Further, the sensor data 506 can include sensor data associated with an environment outside of the vehicle and/or sensor data associated with an environment inside the vehicle. The sensor 504 may generate sensor data 506 based on one or more sensor signal processing settings (e.g., white balance, gain, tint, exposure, color balance, saturation, etc.). For example, the one or more sensor signal processing settings may identify a time period for detection of the sensor data. The sensor data 506 may include streaming sensor data and/or batch sensor data.

The pressure sensor 510 generates pressure sensor data 512 and communicates the pressure sensor data 512 to the situational awareness system 502. The pressure sensor 510 can include a load cell or any other sensor to capture pressure and/or weight. In some cases, the pressure sensor 510 may be located within a seat of the vehicle, an armrest of the vehicle, a floorboard of the vehicle, or any location of the vehicle. In certain cases, the pressure sensor 510 may include a plurality of pressure sensors that may each provide pressure sensor data 512 to the situational awareness system 502. Similarly, the pressure sensor data 512 can include weight data. For example, the pressure sensor data 512 can include weight data associated with a passenger. In some embodiments, the situational awareness system 502 may not receive pressure sensor data 512.

In the illustrated example, the situational awareness system 502 includes a data processor 508 to receive the sensor data 506 and the pressure sensor data 512, however, it will be understood that the system 502 can include fewer, more, or different components. The data processor 508 may also receive mapping data 514. The data processor 508 may receive the mapping data 514 from a computing device (e.g., a user computing device) and/or a data store. For example, the user computing device may generate the mapping data 514 and provide the mapping data 514 to the data processor 508. In some embodiments, the mapping data 514 may be user specific mapping data 514. The mapping data 514 may include a plurality of mappings. The mapping may include first mapping data and second mapping data. Each mapping of the first mapping data may identify a sensor data 506 and/or environmental data mapped to a particular vehicle alert. Each mapping of the second mapping data may identify a particular vehicle alert mapped to particular alert data 516. In some cases, each mapping of the mapping data may identify sensor data 506 and/or environmental data mapped to particular alert data 516.

In some cases, the data processor 508 may receive the sensor data 506 and process the sensor data 506. For example, the data processor 508 may filter and aggregate (e.g., smooth) the sensor data 506 to identify particular features associated with the sensor data. Further, the data processor 508 may filter and aggregate the sensor data 506 to generate stable data signals identifying the sensor data 506.

The data processor 508 may process (e.g., parse, transform, etc.) the sensor data 506 to identify environmental data associated with an environment of the vehicle. For example, the environmental data can identify a particular feature associated with the sensor data. Further, the feature can include data associated with the environment of the vehicle, such as, but not limited to, an obstacle in the road, location of objects around the vehicle, vehicle speed, vehicle acceleration, vehicle orientation, engine status or RPMs, location of the vehicle relative to a destination, the state of the lights of the vehicle (e.g., on/off), etc. Based on processing the sensor data 506 and/or the identified environmental data, the data processor 508 may identify the feature and determine that a passenger of the vehicle should be notified.

In some cases, the data processor 508 may use mapping data 514 associated with a mapping of sensor data and/or environmental data to particular alert data 516 to determine the alert data 516 to output based on incoming sensor data 506. The In certain cases, the data processor 508 may also obtain the pressure sensor data 512 associated with one or more pressure sensors 510. Based on the pressure sensor data 512, the data processor 508 may determine a location of the passenger. For example, based on the pressure sensor data 512, the data processor 508 may determine that a passenger is located in a particular section of the vehicle (e.g., that the passenger is located in the front, right seat). Further, based on the pressure sensor data 512, the data processor 508 may determine the location of multiple passengers. For example, the data processor 508 may determine that five passengers are located in the vehicle and a location of each of the passengers.

In certain cases, based on the pressure sensor data 512, the data processor 508 may identify a type (e.g., a passenger type) of the passenger of the vehicle. In some cases, the data processor 508 may utilize the pressure sensor data 512 to identify a passenger type of each passenger of the vehicle. In certain cases, to identify the passenger type of each passenger, the data processor 508 may use a plurality of weight ranges or thresholds. Each weight range may identify a particular range, threshold, and/or combination of pressure sensor data 512 and map the particular range, threshold, and/or combination of pressure sensor data 512 to a particular type of passenger. For example, a particular range, threshold, and/or combination of pressure sensor data 512 may be mapped to an animal (e.g., a dog), a child, an adult, an inanimate object. Further, a first range of weight may be mapped to an animal (e.g., 5-15 pounds), a second range of weight may be mapped to a child (e.g., 15-90 pounds), a third range of weight may be mapped to an adult (e.g., over 90 pounds), and a fourth range of weight may be mapped to an inanimate object (e.g., 0-5 pounds).

Further, the pressure sensor data 512 may include pressure sensor data 512 from pressure sensors 510 located throughout the vehicle and the data processor 508 may identify the type of passenger based on the pressure sensor data 512. For example, if pressure sensor data 512 from a pressure sensor 510 in a seat indicates a weight below a first threshold (e.g., 1 pound) and pressure sensor data 512 from a pressure sensor in a floorboard located below the seat indicates a weight above a second threshold (e.g., 20 pounds), the data processor 508 may determine the passenger is an animal or that no passenger is present (e.g., the pressure sensor data represents an inanimate object). Further, if pressure sensor data 512 from a pressure sensor in a floorboard located below a set indicates weight below a particular (e.g., 0 pounds) and pressure sensor data 512 from a pressure sensor in the seat indicates a weight above another threshold (e.g., 40 pounds), the data processor 508 may determine the passenger is a child (e.g., a child whose feet are not touching the floorboard).

Further, the data processor 508 may identify a weight distribution across one or more pressure sensors. For example, the data processor 508 may identify a distribution of weight across a first pressure sensor and a second pressure sensor. Based on the distribution of weight across one or more pressure sensors, the data processor 508 may identify a passenger type and/or location of the passenger.

The data processor 508 may also identify variations in the pressure sensor data 512 over a particular time period. Further, the data processor 508 may determine if the pressure sensor data 512 from a particular pressure sensor changes over time. For example, if the data processor 508 determines that the pressure sensor data 512 from a particular pressure sensor has stayed constant over a particular time period, the data processor 508 may determine that the pressure sensor data 512 does not represent a passenger and instead represents an inanimate object (e.g., luggage). Further, if the data processor 508 determines that the pressure sensor data 512 from a particular pressure sensor data 512 has varied over a particular time period, the data processor 508 may determine the pressure sensor data 512 represents a passenger.

Further, the data processor 508 may identify the mapping of the sensor data 506 (and/or the environmental data) to a vehicle alert based on the location and/or the passenger type of the passenger. For example, the same sensor data 506 may be mapped to different alert data 516 based on a location of the passenger. For example, the data processor 508 may parse the sensor data 506 to identify particular sensor data 506 associated with one or more sensors and parse the pressure sensor data 512 to identify the location and/or type of the passenger.

Based on the sensor data 506 (and/or environmental data) and the pressure sensor data 512, the data processor 508 may identify mapping data 514 that maps the sensor data 506 and the pressure sensor data 512 to a particular vehicle alert. Further, the data processor 508 may identify mapping data (e.g., additional mapping data or mapping data 514) that maps the vehicle alert to particular alert data 516. The mapping data 514 and/or the additional mapping data may identify a vehicle alert and/or alert data 516 that is customized to a particular user based on the received sensor data 506 and the received pressure sensor data 512. For example, the alert data 516 may be customized based on the received sensor data 506 and based on the location and/or passenger type of the passenger. For example, the same sensor data 506, environmental data, and/or pressure sensor data 512 for different passenger may be mapped to different vehicle alerts and/or the vehicle alert for different passengers may be mapped to different alert data 516.

The alert data 516 may identify one or more haptic feedback sensors. For example, the alert data 516 can identify particular haptic feedback sensors to be used as part of an alert. Further, the alert data 516 can identify how to activate the particular haptic feedback sensors. For example, the alert data 516 may identify an activation pattern or sequence for the particular haptic feedback sensors, an activation duration for the particular haptic feedback sensors, etc. The alert data 516 may further identify one or more haptic feedback sensor patterns, an audio output, a visual output, a light output, or any other output or feedback that is mapped (e.g., paired) to the vehicle alert. In some embodiments, the data processor 508 may identify alert data 516 for multiple passengers. For example, the data processor 508 may identify first alert data for a first human passenger, second alert data for a second human passenger, and third alert data for an animal passenger. Moreover, as mentioned, the alert data for the different passengers may be different. For example, each of the passengers may receive the same or different alerts based on the first, second, and third alert data. In some cases, the human passengers can receive a different alert from the animal passenger based on the determined type of the passenger (e.g., adult, human, animal, etc.).

In some cases, the situational awareness system 502 may activate the haptic feedback sensor 518 using the alert data 516. For example, the situational awareness system 502 may identify the haptic feedback sensor 518 based on the alert data 516 and provide the alert data 516 to activate the haptic feedback sensor 518. In some embodiments, the situational awareness system 502 may customize how the haptic feedback sensor 518 is activated based on the alert data 516. For example, the situational awareness system 502 may identify activation parameters (e.g., an activation pattern or sequence, an activation duration, etc.) for the haptic feedback sensor 518 based on the alert data 516 and activate the haptic feedback sensor 518 based on the activation parameters. It will be understood that the situational awareness system 502 may provide the alert data 516 to more, less, or different haptic feedback sensors. Based on the activation of the haptic feedback sensor 518 by the situational awareness system 502, the haptic feedback sensor 518 may provide haptic feedback to a passenger of the vehicle. For example, the haptic feedback may include one or more vibrations that are provided by the haptic feedback sensor 518.

The alert data 516 may include a pulse-width modulation signal for activation of the haptic feedback sensor 518. For example, the situational awareness system 502 may provide the pulse-width modulation signal to the haptic feedback sensor 518 to cause activation of the haptic feedback sensor 518.

The situational awareness system 502 may activate the haptic feedback sensor 518 such that haptic feedback can be received by the passenger. The passenger may receive the haptic feedback and identify data associated with the vehicle based on the haptic feedback (e.g., environmental data, directional data, landmark data, object data, vehicle state data, vehicle status data, etc.). In some embodiments, the situational awareness system 502 may activate a series of haptic feedback sensors to guide the passenger to a desired location within the vehicle. For example, the situational awareness system may activate a series of haptic feedback sensors to guide a passenger's hand from a first position (e.g., an arm rest) to a second position (e.g., a door handle).

In some cases, the situational awareness system 502 may provide the alert data 516 to a computing device 520 (e.g., a user computing device, a vehicle computing device, etc.). The computing device 520 may include one or more haptic feedback sensors and the situational awareness system 502 may activate the one or more haptic feedback sensors using the alert data 516. In some embodiments, the situational awareness system 502 may provide different alert data to the computing device 520 and the haptic feedback sensor 518. For example, the situational awareness system 502 may provide customized alert data (e.g., based on the one or more haptic feedback sensors of the computing device 520) to the computing device 520. The alert data of the computing device 520 and the alert data of the haptic feedback sensor 518 may be paired to identify the sensor data 506 and the pressure sensor data 512. Further, the situational awareness system 502 may provide customized alert data to activate an audio output, a visual output, a light output, or any other output of the computing device 520. For example, the computing device 520 may include a display, light(s) (e.g., light-emitting diodes (LEDs), and/or a speaker. The situational awareness system 502, via the display and/or speaker of the computing device 520, may provide the audio output, visual output, light output, etc. Further, the audio output, visual output, light output, etc. may be linked to and/or associated with the haptic feedback provided by the haptic feedback sensor 518. In some embodiments, the situational awareness system 502 may not provide the alert data 516 to the computing device 520.

It will be understood that the situational awareness system 502 can include fewer, more, or different components. For example, the situational awareness system 502 can include multiple data processors 508 performing different processing functions on the sensor data 506 and/or processing sensor data 506 from different sensors. Further, the situational awareness system 502 may provide the alert data to multiple computing devices.

Example Haptic Feedback Sensor Patterns

Figure 6:
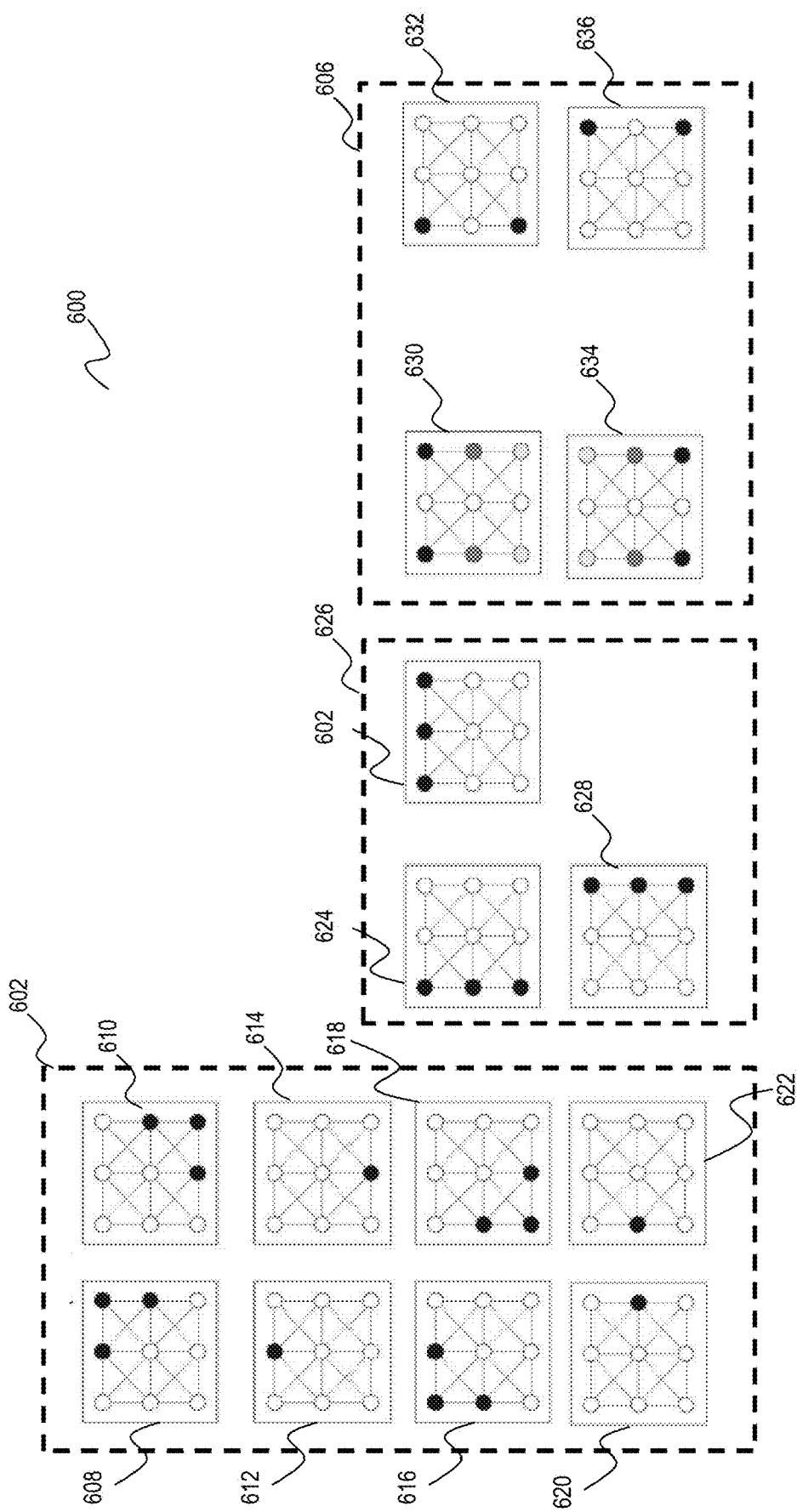
FIG. 6 is a diagram illustrating example haptic feedback sensor patterns.

FIG. 6 is a diagram 600 illustrating example haptic feedback sensor patterns. For example, the diagram 600 includes a plurality of haptic feedback sensor patterns that are each mapped to particular sensor data and/or pressure sensor data via mapping data. The haptic feedback sensor patterns can include one or more groups of haptic feedback sensor patterns. For example, the one or more groups of haptic feedback sensor patterns can include at least a first group 602 of patterns, a second group 604 of patterns, and a third group 606 of patterns. Each haptic feedback sensor pattern of the one or more groups of haptic feedback sensor patterns may correspond to a unique combination of the activation of haptic feedback sensors.

Further, a system may map each haptic feedback sensor pattern to a particular vehicle alert. In some cases, a system may map each haptic feedback sensor pattern to particular sensor data, particular environmental data, and/or particular pressure sensor data. The system may generate the mapping data based on mapping the haptic feedback sensors. In some embodiments, the mapping data may be customized for a particular group of users, a particular user, a particular group of haptic feedback sensors located in a particular vehicle, etc. For example, the system may identify data associated with the user (e.g., a user location, a user grouping, a user profile) and identify mapping data associated with the user. Further, users with a first sensory disability may be associated with different mapping data than users with a second sensory disability. For example, users with an audible sensory disability may be associated with mapping data that maps sensor data and/or pressure sensor data to haptic feedback sensor patterns and a visual output and users with a visual sensory disability may be associated with mapping data that maps sensor data and/or pressure sensor data to haptic feedback sensor patterns and an audible output.

In some embodiments, a user, via a user computing device, may define the haptic feedback sensor patterns and/or the groups of haptic feedback sensor patterns. For example, the user may define a particular haptic feedback sensor pattern for particular sensor data and/or particular pressure sensor data. Further, based on the user defined particular haptic feedback sensor pattern, the haptic feedback sensor pattern can be mapped to the sensor data and/or the pressure sensor data. In some embodiments, a system may map the haptic feedback sensor patterns to the sensor data and/or the pressure sensor data and the user can modify the previous mapping.

In order to define the haptic feedback sensor patterns, the user may define how particular haptic feedback sensors provide haptic feedback. Further, the user may define which haptic feedback sensors provide feedback, how the haptic feedback sensors provide feedback, an order of the feedback from the haptic feedback sensors, a time period for the activation of each haptic feedback sensor, etc. For example, the user may define a haptic feedback sensor pattern that includes, at a first time, the activation of a first at least one haptic feedback sensor at a first location within the vehicle, at a second time, the activation of a second at least one haptic feedback sensor at a second location within the vehicle, and, at a third time, the activation of a third at least one haptic feedback sensor at a third location within the vehicle. The first, second, and third at least one haptic feedback sensors activated at the different times can be the same or different sensors at the same or different locations. It will be understood that the haptic feedback sensor pattern can include the activation of more, less, or different haptic feedback sensors. In some embodiments, the haptic feedback sensor pattern may include the activation of one or more haptic feedback sensors at the same time. For example, the haptic feedback sensor pattern can include the activation of multiple haptic feedback sensors at the same time.

In some cases, the system may generate a user interface that illustrates the haptic feedback sensor patterns and/or the groups of haptic feedback sensor patterns. The user interface may be interactive and may enable a user to define a customized haptic feedback sensor pattern for particular sensor data, environmental data, and/or pressure sensor data. For example, the user may identify a particular pattern of haptic feedback based on the system determining the vehicle is approaching a destination using the sensor data and based on the system identifying a location and/or type of the passenger using the pressure sensor data.

Each haptic feedback sensor pattern may be mapped to a directed acyclic graph. The directed acyclic graph may identify various haptic feedback sensors and may further identify the activation of a subset of the haptic feedback sensors corresponding to the haptic feedback sensor pattern.

In the example of FIG. 6, the groups of haptics feedback sensor patterns include the first group 602 of haptic feedback sensor patterns. The first group 602 may include haptic feedback sensor patterns that are each mapped to particular sensor data and/or environmental data associated with a landmark (e.g., an obstacle) within an environment of the vehicle. For example, each haptic feedback sensor pattern of the first group 602 may identify a particular pattern of haptic feedback sensors that are each mapped to a location (e.g., a directional component) associated with the landmark.

As a non-limiting example, the first group 602 may include a first haptic feedback sensor pattern 608 that identifies the activation of one or more haptic feedback sensors to identify a forward-right direction of a landmark, a second haptic feedback sensor pattern 610 that identifies the activation of one or more haptic feedback sensors to identify a rear-right direction of a landmark, a third haptic feedback sensor pattern 612 that identifies the activation of one or more haptic feedback sensors to identify a forward direction of a landmark, a fourth haptic feedback sensor pattern 614 that identifies the activation of one or more haptic feedback sensors to identify a rear direction of a landmark, a fifth haptic feedback sensor pattern 616 that identifies the activation of one or more haptic feedback sensors to identify a forward-left direction of a landmark, a sixth haptic feedback sensor pattern 618 that identifies the activation of one or more haptic feedback sensors to identify a rear-left direction of a landmark, a seventh haptic feedback sensor pattern 620 that identifies the activation of one or more haptic feedback sensors to identify a right direction of a landmark, and an eighth haptic feedback sensor pattern 622 that identifies the activation of one or more haptic feedback sensors to identify a left direction of a landmark.

The groups of haptic feedback sensor patterns further includes a second group 604 of haptic feedback sensor patterns. The second group 604 may include haptic feedback sensor patterns that are each mapped to the presence of a particular feature within an environment associated with the vehicle. For example, each haptic feedback sensor pattern of the second group 604 may identify a particular pattern of haptic feedback sensors that are each mapped to the presence of a particular feature. For example, the particular feature may include another vehicle, a human, an obstacle (e.g., a curb, a sign, a tree, a bush), a wall, or any other feature within the environment associated with the vehicle. Further, each haptic feedback sensor pattern of the second group 604 may be used to indicate to a passenger how to exit the vehicle. For example, a particular haptic feedback sensor pattern of the second group 604 may indicate to a passenger to exit on a particular side of the vehicle based on the presence of a curb adjacent to the side of the vehicle. The second group 604 may include a first haptic feedback sensor pattern 624 that identifies the activation of one or more haptic feedback sensors to identify the presence of a curb on the left side of the vehicle, a second haptic feedback sensor pattern 626 that identifies the activation of one or more haptic feedback sensors to identify the presence of a curb on the right side of the vehicle, and a third haptic feedback sensor pattern 628 that identifies the activation of one or more haptic feedback sensors to identify the presence of a stop sign in a forward direction of the vehicle.

The groups of haptic feedback sensor patterns further include a third group 606 of haptic feedback sensor patterns. The third group 606 may include haptic feedback sensor patterns that are each mapped to a state of the vehicle or vehicle component. For example, each haptic feedback sensor pattern of the third group 606 may identify a particular pattern of haptic feedback sensors that are each mapped to a particular state of the vehicle. For example, the state of the vehicle may include the vehicle turning, the vehicle accelerating, the vehicle turning on, the vehicle braking, the vehicle driving over a bump, the vehicle pulling over, the activation of the windshield wipers of the vehicle, the activation of particular lights of the vehicle, the activation of a low gas identifier (e.g., a low gas light) of the vehicle identifying that the vehicle is low on gasoline, the activation of a low charge identifier of the vehicle identifying that the vehicle is low on charge, the activation of a check engine identifier of the vehicle, the activation and/or deactivation of a seat belt, the activation of an autonomous driving system, the presence of personal belongings on a seat of the vehicle, and/or any other state of the vehicle. The third group 606 may include a first haptic feedback sensor pattern 630 that identifies the activation of one or more haptic feedback sensors to identify a movement of the vehicle in a forward direction, a second haptic feedback sensor pattern 632 that identifies the activation of one or more haptic feedback sensors to identify a movement of the vehicle in a left direction, a third haptic feedback sensor pattern 634 that identifies the activation of one or more haptic feedback sensors to identify a movement of the vehicle in a rear direction, and a fourth haptic feedback sensor pattern 636 that identifies the activation of one or more haptic feedback sensors to identify a movement of the vehicle in a right direction.

It will be understood that while FIG. 6 refers to haptic feedback, more, less, or different types of feedback or output may be provided. For example, light emitting diode (LED) feedback or output using LEDs may be provided based on the sensor patterns identified in FIG. 6. In some cases, the system may provide LED feedback instead of or in combination with the haptic feedback. Accordingly, the description herein related to the placement of and providing feedback using haptic feedback sensors can similarly be used to place and provide feedback using LEDs, etc.

Activation of Haptic Feedback Sensors

Figure 7:
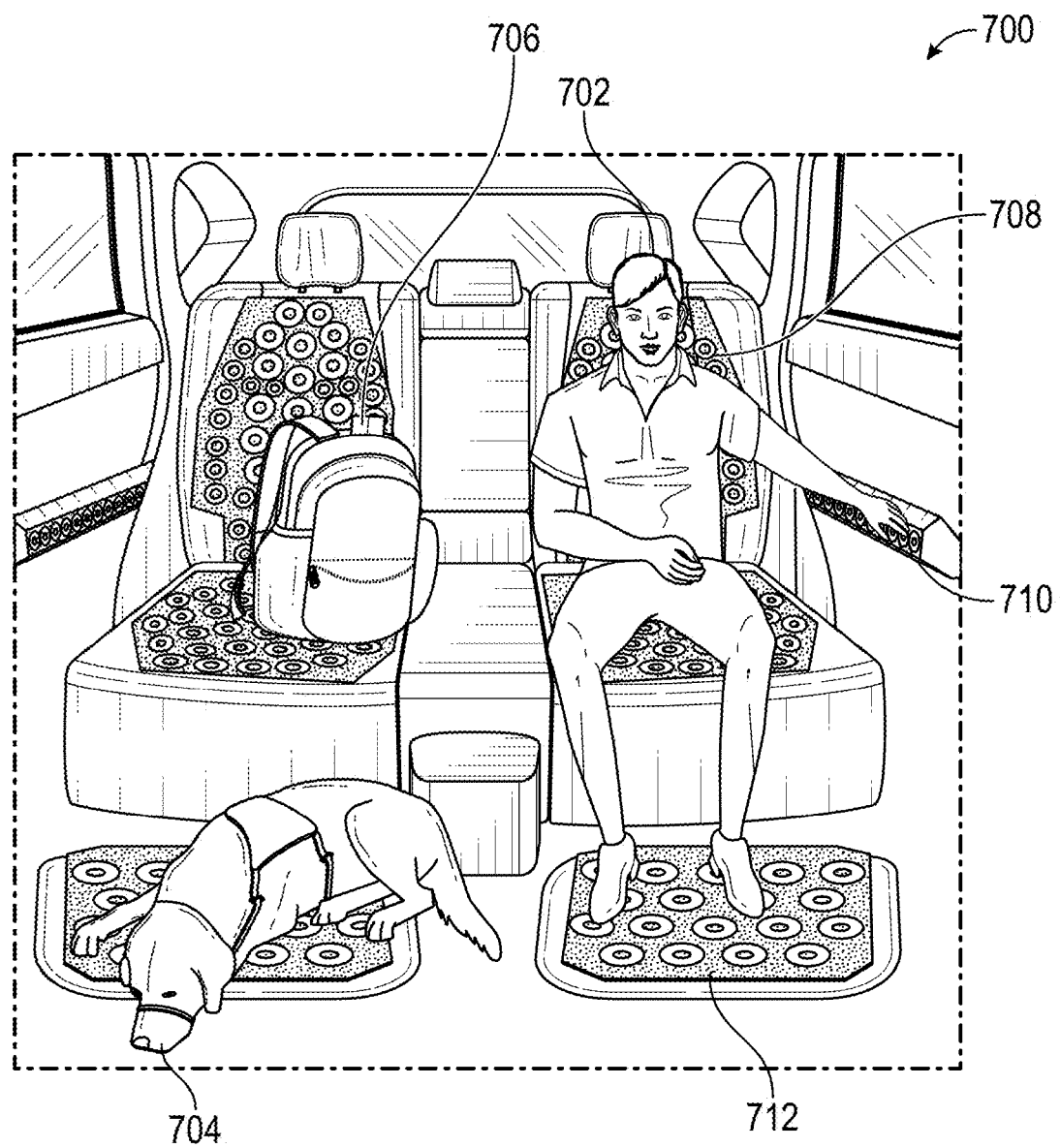
FIG. 7 is an example environment in which a vehicle including one or more haptic feedback sensors can be implemented.

FIG. 7 illustrates an example environment 700 of an interior of a vehicle including one or more haptic feedback sensors 708, 710, 712 that can be activated based on sensor data, environmental data, and/or pressure sensor data identified by the vehicle. The vehicle may include the one or more haptic feedback sensors to provide haptic feedback to a passenger (e.g., a human passenger or an animal passenger) of the vehicle. For example, the vehicle may activate a subset of the one or more haptic feedback sensors 708, 710, 712 to provide an indication of obtained sensor data and/or environmental data.

In the illustrated example of FIG. 7, the environment 700 includes a portion of an interior of a vehicle. The vehicle may include a plurality of different characteristics. For example, the vehicle can include multiple seats, multiple doors, etc. As seen in FIG. 7, the vehicle includes one row of two seats and two doors. It will be understood that the vehicle may include more, less, or different characteristics. For example, the vehicle may include multiple rows that each include multiple seats and four doors.

The illustrated environment 700 includes a human passenger 702 that is located in a particular location of the vehicle (e.g., the human passenger 702 may be seated in a first seat of the vehicle) and an animal passenger 704 (e.g., a service animal) that is located in a second location of the vehicle (e.g., the animal passenger 704 may be located in a floorboard adjacent to a second seat of the vehicle). Further, the illustrated environment 700 includes an item 706 (e.g., a backpack, groceries, luggage, or any other inanimate objects) located in a third location of the vehicle (e.g., the item 706 may be located in a second seat of the vehicle). It will be understood that the environment 700 may include more, less, or different passengers (e.g., human passengers or animal passengers) or items.

The vehicle may further include a plurality of sensors that are distributed throughout the vehicle. Further, the vehicle may include a plurality of output devices for output of audible data, visual data, haptic feedback, etc. that is mapped to particular sensor data. In the example of FIG. 7, the vehicle can include a first plurality of sensors 708, a second plurality of sensors 710, and a third plurality of sensors 712.

The first plurality of sensors 708 may include sensors located in one or more seats of the vehicle. Further, the first plurality of sensors 708 may include sensors located in a seat and an associated seat back of the vehicle. The second plurality of sensors 710 may include sensors located in one or more doors of the vehicle. For example, the second plurality of sensors 710 may include sensors located in an armrest of the vehicle. The third plurality of sensors 712 may include sensors located in a floorboard of the vehicle. It will be understood that the vehicle may include more, less, or different sensors distributed throughout the vehicle. For example, the vehicle may include sensors located in a center console, a dashboard, etc. of the vehicle.

Each of the first plurality of sensors 708, the second plurality of sensors 710, and the third plurality of sensors 712 may include at least one haptic feedback sensor and/or at least one pressure sensor. For example, the first group of sensors 708 may include a one or more pressure sensors located in a seat of the vehicle and one or more haptic feedback sensors located in the seat and seat back of the vehicle. It will be understood that the first plurality of sensors 708, the second plurality of sensors 710, and the third plurality of sensors 712 may include more, less, or different types of sensors.

The plurality of pressure sensors of the first plurality of sensors 708, the second plurality of sensors 710, and the third plurality of sensors 712 may provide pressure sensor data. For example, the first plurality of sensors 708 may provide pressure sensor data for a first seat of the vehicle and a second seat of the vehicle, the second plurality of sensors 710 may provide pressure sensor data for a first floorboard of the vehicle and a second floorboard of the vehicle, and the third plurality of sensors 712 may provide pressure sensor data for a first armrest of the vehicle and a second armrest of the vehicle. Based on the pressure sensor data, a system may identify that a human passenger is located in the first seat of the vehicle and an inanimate object is located in the second seat of the vehicle. For example, based on pressure sensor data identifying a weight associated with the first armrest, a weight associated with the first seat, and a weight associated with the first floorboard, the system may determine that a human passenger 702 is seated in the first seat. Further, based on pressure sensor data identifying a weight associated with the second armrest, a weight associated with the second seat, and a weight associated with the second floorboard, the system may determine that an item 706 is located in the second seat and an animal passenger 704 is located on the second floorboard.

Further, particular combinations of haptic feedback sensors of the first plurality of sensors 708, the second plurality of sensors 710, and the third plurality of sensors 712 may be mapped to particular sensor data using mapping data. For example, mapping data may identify the haptic feedback sensors located in the vehicle and identify a pattern and/or combination of the activation of haptic feedback sensors for particular sensor data. Each of the haptic feedback sensors may include a motor (e.g., a vibration motor) and, upon receiving alert data, may cause the motor to provide haptic feedback (e.g., vibrations) to a passenger of the vehicle based on the received alert data.

In some embodiments, each of the first plurality of sensors 708, the second plurality of sensors 710, and the third plurality of sensors 712 may be mapped to different alert data based on the same sensor data. For example, each of the first plurality of sensors 708, the second plurality of sensors 710, and the third plurality of sensors 712 may output particular haptic feedback based on received sensor data. In other embodiments, one or more of the first plurality of sensors 708, the second plurality of sensors 710, and the third plurality of sensors 712 may output the same haptic feedback based on received sensor data. For example, the first plurality of sensors 708 and the third plurality of sensors 712 may output the same haptic feedback at different locations within the vehicle based on the obtained sensor data.

Figure 8:
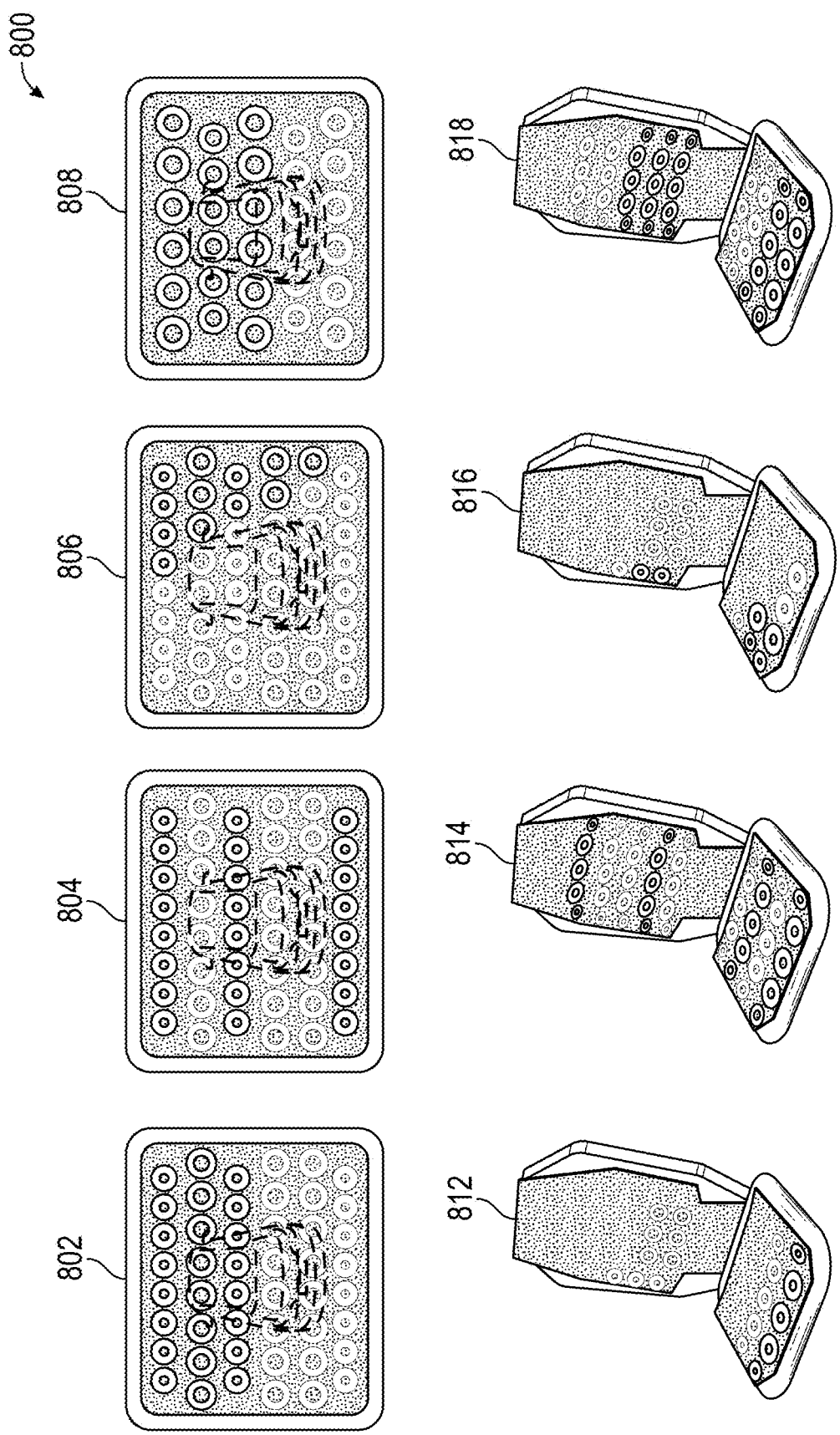
FIG. 8 is a diagram illustrating example haptic feedback sensor patterns for a floor and a seat.

FIG. 8 illustrates non-limiting examples of haptic feedback sensor patterns for a floor and a seat of the vehicle. In the illustrated example, a first set of haptic feedback sensor patterns (802-808) are mapped to a floor of the vehicle and a second set of haptic feedback sensor patterns (812-818) are mapped to a seat of the vehicle. The first set of haptic feedback sensor patterns may be mapped to any location of the floor of the vehicle and the second set of haptic feedback sensor patterns may be mapped to any seat of the vehicle. In the illustrated example, a first pattern 802 of the first set of haptic feedback sensor patterns and a first pattern 812 of the second set of haptic feedback sensor patterns identifies that an object is located in front of the vehicle. A second pattern 804 of the first set of haptic feedback sensor patterns and a second pattern 814 of the second set of haptic feedback sensor patterns identifies that the vehicle is slowing down. A third pattern 806 of the first set of haptic feedback sensor patterns and a third pattern 816 of the second set of haptic feedback sensor patterns indicates that an object is located in the front and to the right of the vehicle. A fourth pattern 808 of the first set of haptic feedback sensor patterns and a fourth pattern 818 of the second set of haptic feedback sensor patterns indicates that the vehicle is approaching a destination. It will be understood that fewer or more patterns can be used for the examples given and/or the patterns described can be used to indicate different information. In addition, it will be understood that the patterns 802-808 can be matched with the patterns 812-818 in a manner that is different than the examples provided.

Example Flow Diagram of Data Processor

Figure 9:
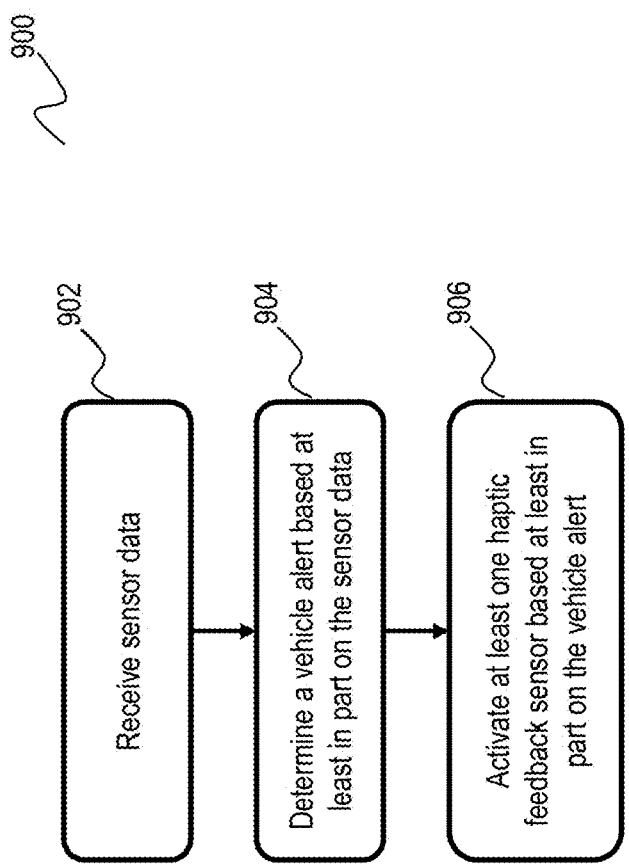
FIG. 9 is a flow diagram illustrating an example of a routine implemented by one or more processors activate at least one haptic feedback sensor based on a vehicle alert.

FIG. 9 is a flow diagram illustrating an example of a routine 900 implemented by one or more processors (e.g., one or more processors of the situational awareness system 502). The flow diagram illustrated in FIG. 9 is provided for illustrative purposes only. It will be understood that one or more of the steps of the routine illustrated in FIG. 9 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 902, the situational awareness system 502 receives sensor data associated with a vehicle. The sensor data can be associated with sensors sensing the interior environment of the vehicle or the exterior environment of the vehicle. For example, as described herein, the sensor data may include camera data associated with a camera, lidar data associated with a lidar device, radar data associated with radar device. In some such cases, the situational awareness system 502 may receive the sensor data from a camera image sensor, a lidar sensor, a radar sensor, a pressure sensor, an accelerometer, a gyroscope, etc. As described herein, the sensor data may include seatbelt buckle data associated with a state of a seatbelt of the vehicle (e.g., buckled or unbuckled), windshield wiper data associated with a state of the windshield wipers (e.g., on/off, speed, etc.), light data associated with a state of one or more lights of the vehicle (e.g., on/off), velocity data associated with a velocity of the vehicle, location data associated with a location of the vehicle, engine data associated with a state of the engine of the vehicle (e.g., on/off, RPMs, etc.), acceleration associated with an acceleration of the vehicle, orientation data associated with an orientation of the vehicle (e.g., North, South, East, West, etc.), trunk data associated with a trunk of the vehicle (e.g., open, closed), window data associated with a state of a window of the vehicle (e.g., open/closed, amount open, etc.), In some cases, the sensor data may include weather sensor data. The weather sensor data may be associated with the weather at a location of the vehicle. For example, the weather sensor data may identify that the weather at the location of the vehicle is sunny, cloudy, rainy, etc. Further, the sensor data may include temperature data identifying a temperature at the location of the vehicle. For example, the temperature data may identify that the temperature at the location of the vehicle is below (or above) a particular threshold (e.g. 75 degrees). The sensor data may also include time of day data identifying a time of day associated with the environment of the vehicle. Further, the sensor data may also include traffic data identifying the traffic (e.g., vehicle traffic or human traffic) associated with the environment of the vehicle.

In some cases, the sensor data may include speed sensor data. The speed sensor data may be associated with a speed of a speed sensor of the vehicle. For example, the speed sensor data may identify a particular speed (e.g., 75 miles per hour). Further, the sensor data may include location sensor data. The location sensor data may be associated with a location of the vehicle. For example, the location sensor data may identify a particular location (e.g., coordinates associated with a particular location. Further, the sensor data may include accelerometer data. The accelerometer data may be associated with an acceleration of an accelerometer of the vehicle. For example, the accelerometer data may identify a particular acceleration (e.g., 6 miles per second). Further, the sensor data may include orientation data. The orientation data may be associated with an orientation of a gyroscope of the vehicle. For example, the orientation data may identify a particular orientation of the gyroscope (e.g., North).

At block 904, the situational awareness system 502 determines a vehicle alert based at least in part on the sensor data. Further, the situational awareness system 502 can determine a vehicle alert for a passenger of the vehicle. The situational awareness system 502 may further identify a directional component associated with the vehicle alert. For example, the directional component may identify a location associated with the sensor data and/or a location associated with a sensor producing the sensor data.

In some cases, to determine the vehicle alert, the situational awareness system 502 may determine environmental data associated with the environment of the vehicle based on the sensor data. The environmental data may include data related to the environment external to the vehicle, the environment internal to the vehicle, and/or a state of the vehicle or a vehicle component.

For example, using image data associated with an imaging sensor (e.g., lidar, radar, camera, etc.), the system can determine environmental data that identifies an object in an environment of the vehicle. The system can determine the vehicle alert based at least in part on the identified object in the environment. Further, the situational awareness system 502 may identify an object type of the object and/or a location of the object relative to the vehicle. For example, the object type of the object may include a pedestrian, a vehicle, an animal, a landmark, origin, destination, etc.

As another non-limiting example, the system 502 can determine environmental data that identifies a state of the vehicle or component of the vehicle based on the sensor data. For example, the state of the vehicle may identify a speed of the vehicle, a state of a windshield wiper of the vehicle, a state of a light of the vehicle, a state of the engine or the vehicle, a state of a sensor of the vehicle, a state of a component of the vehicle, etc. For example, the state of the vehicle may identify a state of a seatbelt sensor of the vehicle. The state of the vehicle may identify whether a particular component is engaged, disengaged, turned on, turned off, a level of engagement (e.g., a particular speed), a repair status, etc. For example, the state of the vehicle may indicate that a particular component (e.g., a camshaft position sensor, a light bulb, a tire) requires repair or replacement.

In some cases, the situational awareness system 502 may determine the environmental data by determining a determined location of the vehicle satisfies a threshold distance relative to a location (e.g., a destination of the vehicle, an origin location of the vehicle, etc.). For example, the situational awareness system 502 may determine environmental data that indicates the vehicle is approaching a destination using the sensor data. Upon determining that the vehicle is within a threshold distance of a particular location, the situational awareness system 502 may determine a vehicle alert associated with the determination.

In some cases, the system 502 can use a mapping that maps sensor data and/or environmental data to a particular vehicle alert. As described herein, the mapping can identify a vehicle alert for one or more combinations of incoming sensor data and/or determined environmental data.

In certain cases, the situational awareness system 502 may include an alert-sensor mapping that maps a particular vehicle alert to at least one haptic feedback sensor. Further, the situational awareness system 502 may identify a plurality of vehicle alerts and a plurality of haptic feedback sensors. The situational awareness system 502 (or a separate system) may obtain and/or generate a plurality of mappings that map particular vehicle alerts to a particular subset of the plurality of haptic feedback sensors. In some embodiments, the situational awareness system 502 may obtain the mapping from a computing device associated with the passenger.

In some embodiments, the situational awareness system 502 may receive pressure sensor data associated with a pressure sensor of the vehicle. Further, the situational awareness system 502 may determine a location of the passenger based on the pressure sensor data and identify at least one haptic feedback sensor based on the location of the passenger from a plurality of locations in the vehicle. For example, a plurality of haptic feedback sensors may be located at the plurality of locations in the vehicle and the situational awareness system 502 may identify the at least one haptic feedback sensor based on the location of the passenger.

Further, the situational awareness system 502 may identify a passenger type (e.g., a human passenger, an animal passenger, etc.) of the passenger based on the pressure sensor data. The situational awareness system 502 may determine the vehicle alert based on the passenger type of the passenger and/or the location of the passenger. For example, the vehicle alert for a human passenger may be different than the vehicle alert for an animal passenger. Further, the vehicle alert for a human passenger may be mapped to specific alert data and the vehicle alert for the animal passenger may be mapped to general alert data.

At block 906, the situational awareness system 502 activates at least one haptic feedback sensor based at least in part on the vehicle alert. For example, the situational awareness system 502 may activate the at least one haptic feedback sensor based on a mapping of the at least one haptic feedback sensor to the vehicle alert. The vehicle alert may be mapped to particular alert data and the situational awareness system 502 may activate the at least one haptic feedback sensor by providing the alert data to the at least one haptic feedback sensor. Further, the situational awareness system 502 may activate a plurality of haptic feedback sensors according to a predefined pattern based on the vehicle alert. The at least one haptic feedback sensor may include at least one haptic feedback sensor located in at least one of a floor (e.g., a floorboard) of the vehicle, a seat of the vehicle, a seatback of the vehicle, a headrest of the vehicle, an armrest of the vehicle, a door of the vehicle, a console of the vehicle, a steering wheel of the vehicle, a roof of the vehicle, a dashboard of the vehicle, or any other location within the vehicle. In some embodiments, the situational awareness system 502 may activate the at least one haptic feedback sensor based on the directional component associated with the vehicle alert, the object type of an object, a location of an object, the determined location of the vehicle satisfying a threshold distance, a location of the passenger, a passenger type of the passenger, etc.

In some embodiments, the situational awareness system 502 may identify a mapping of the vehicle alert to a haptic feedback sensor of a user computing device. For example, the haptic feedback sensor may form part of a user computing device associated with the passenger. Further, the situational awareness system 502 may activate the haptic feedback sensor of the user computing device based on the mapping. For example, the situational awareness system 502 may communicate the vehicle alert to the user computing device and the user computing device may activate the haptic feedback sensor. In some embodiments, the haptic feedback sensor of the user computing device and the at least one haptic feedback sensor may provide the same haptic feedback (e.g., output the same haptic feedback). In other embodiments, the haptic feedback sensor of the user computing device and the at least one haptic feedback sensor may provide different haptic feedback.

Further, the situational awareness system 502 may identify a mapping of the vehicle alert to audio data and/or video data. Further, the situational awareness system 502 may cause a computing device (e.g., a computing device of the vehicle, a user computing device, etc.) to output the audio data and/or video data based on the mapping.

It will be understood that the routine 900 can be repeated multiple times using different sensor data. In some cases, the situational awareness system 502 may iteratively repeat the routine 900 for multiple sets of sensor data that are received from multiple sensors.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

Various additional example embodiments of the disclosure can be described by the following clauses:

Clause 1: A method, comprising:
  receiving, using at least one processor, sensor data associated with a vehicle;
  determining a vehicle alert for a passenger of the vehicle based at least in part on the sensor data associated with the vehicle; and
  activating at least one haptic feedback sensor based at least in part on the vehicle alert for the passenger.

Clause 2: The method of Clause 1, wherein the at least one haptic feedback sensor comprises at least one haptic feedback sensor located in at least one of a floor of the vehicle, a seat of the vehicle, a headrest of the vehicle, an armrest of the vehicle, a door of the vehicle, a steering wheel of the vehicle, a dashboard of the vehicle, a roof of the vehicle, or a console of the vehicle.

Clause 3: The method of Clause 1 or Clause 2, wherein the sensor data comprises at least one of camera data, lidar data, or radar data, and wherein the sensor data is further associated with at least one of a camera image sensor, a lidar sensor, a radar sensor, a pressure sensor, an accelerometer, or a gyroscope.

Clause 4: The method of any one of Clauses 1 through 3, wherein the sensor data comprises weather sensor data associated with weather at a location of the vehicle, wherein determining the vehicle alert for the passenger of the vehicle comprises determining the vehicle alert for the passenger based at least in part on the weather at the location of the vehicle.

Clause 5: The method of any one of Clauses 1 through 4, further comprising identifying a directional component associated with the vehicle alert, wherein activating the at least one haptic feedback sensor comprises activating the at least one haptic feedback sensor further based at least in part on the vehicle alert and the directional component associated with the vehicle alert.

Clause 6: The method of any one of Clauses 1 through 5, wherein determining the vehicle alert for the passenger of the vehicle comprises identifying an object in an environment of the vehicle and determining the vehicle alert for the passenger based at least in part on the object in the environment.

Clause 7: The method of Clause 6, wherein determining the vehicle alert for the passenger of the vehicle further comprises identifying an object type of the object and a location of the object relative to the vehicle, wherein the object type of the object comprises at least one of a pedestrian, another vehicle, an animal, or a landmark, and determining the vehicle alert for the passenger based at least in part on the object in the environment, the object type of the object, and the location of the object.

Clause 8: The method of any one of Clauses 1 through 7, wherein determining the vehicle alert for the passenger of the vehicle comprises determining a state of the vehicle, wherein the state of the vehicle comprises at least one of a state of a speed of the vehicle, a state of a windshield wiper of the vehicle, a state of a light of the vehicle, or a state of a sensor of the vehicle.

Clause 9: The method of any one of Clauses 1 through 8, wherein determining the vehicle alert for the passenger of the vehicle comprises determining a determined location of the vehicle satisfies a threshold distance relative to a destination location, and determining the vehicle alert for the passenger based at least in part on determining the determined location of the vehicle satisfies the threshold distance relative to the destination location.

Clause 10: The method of any one of Clauses 1 through 9, further comprising:
  identifying a plurality of vehicle alerts, wherein the plurality of vehicle alerts comprises the vehicle alert for the passenger of the vehicle;
  identifying a plurality of haptic feedback sensors, wherein the plurality of haptic feedback sensors comprises the at least one haptic feedback sensor; and
  generating a plurality of mappings, wherein each mapping of the plurality of mappings maps a particular vehicle alert of the plurality of vehicle alerts to a particular subset of the plurality of haptic feedback sensors, wherein the plurality of mappings comprises a mapping of the vehicle alert for the passenger of the vehicle to the at least one haptic feedback sensor.

Clause 11: The method of any one of Clauses 1 through 10, further comprising obtaining an alert-sensor mapping from a computing device associated with the passenger, wherein the alert-sensor mapping includes mappings between a plurality of vehicle alerts and a plurality of haptic feedback sensors, wherein the mappings includes at least one mapping between the vehicle alert and the at least one haptic feedback sensor, wherein activating the at least one haptic feedback sensor comprises activating the at least one haptic feedback sensor based at least in part on the at least one mapping.

Clause 12: The method of any one of Clauses 1 through 11, further comprising:
identifying a mapping of the vehicle alert for the passenger to the at least one haptic feedback sensor, wherein activating the at least one haptic feedback sensor is further based at least in part on identifying the mapping.

Clause 13: The method of Clause 12, wherein the mapping is a first mapping and the at least one haptic feedback sensor is a first haptic feedback sensor, the method further comprising:
identifying a second mapping of the vehicle alert for the passenger of the vehicle to a second haptic feedback sensor of a user computing device; and
activating the second haptic feedback sensor based at least in part on the second mapping of the vehicle alert for the passenger of the vehicle to the second haptic feedback sensor.

Clause 14: The method of Clause 12 or Clause 13, wherein the mapping is a first mapping, the method further comprising:
identifying a second mapping of the vehicle alert for the passenger of the vehicle to at least one of audio data or video data; and
causing a computing device to output the at least one of the audio data or the video data based at least in part on the second mapping of the vehicle alert for the passenger of the vehicle to the at least one of the audio data or the video data.

Clause 15: The method of any one of Clauses 1 through 14, wherein the at least one haptic feedback sensor forms part of a computing device associated with the passenger, wherein activating the at least one haptic feedback sensor comprises communicating the vehicle alert to the computing device associated with the passenger, wherein the computing device associated with the passenger activates the at least one haptic feedback sensor.

Clause 16: The method of any one of Clauses 1 through 15, further comprising:
receiving, using the at least one processor, weight data associated with a pressure sensor of the vehicle;
determining a location of the passenger based at least in part on the weight data; and
identifying the at least one haptic feedback sensor from a plurality of haptic feedback sensors based at least in part on the location of the passenger, wherein the plurality of haptic feedback sensors are located at a plurality of locations in the vehicle,
wherein the at least one haptic feedback sensor is activated based at least in part on the identifying the location of the passenger.

Clause 17: The method of any one of Clauses 1 through 16, further comprising:
receiving, using the at least one processor, weight data associated with a pressure sensor of the vehicle;
determining a location of the passenger based at least in part on the weight data; and
identifying a passenger type of the passenger based at least in part on the weight data,
wherein determining the vehicle alert for the passenger comprises determining the vehicle alert for the passenger based at least in part on the location of the passenger and the passenger type of the passenger, and
wherein activating the at least one haptic feedback sensor based at least in part on the vehicle alert for the passenger comprises activating the at least one haptic feedback sensor based at least in part on the location of the passenger.

Clause 18: The method of Clause 17, wherein identifying the passenger type of the passenger comprises identifying the passenger as at least one of a human or an animal, wherein the vehicle alert for the human is different than the vehicle alert for the animal.

Clause 19: A system, comprising:
at least one processor, and
at least one non-transitory storage media storing instructions that, when executed by the at least one processor, cause the at least one processor to:
receive sensor data associated with a vehicle;
determine a vehicle alert for a passenger of the vehicle based at least in part on the sensor data associated with the vehicle; and
activate at least one haptic feedback sensor based at least in part on the vehicle alert for the passenger.

Clause 20: At least one non-transitory storage media storing instructions that, when executed by a computing system comprising a processor, cause the computing system to:
receive sensor data associated with a vehicle;
determine a vehicle alert for a passenger of the vehicle based at least in part on the sensor data associated with the vehicle; and
activate at least one haptic feedback sensor based at least in part on the vehicle alert for the passenger.

What is claimed is:

1. A method, comprising:
receiving, using at least one processor, sensor data associated with a vehicle;
determining, using the at least one processor, a vehicle alert for a passenger of the vehicle based at least in part on the sensor data;
identifying, using the at least one processor, from a plurality of mappings, a mapping of the vehicle alert to a subset of a plurality of haptic feedback sensors, wherein each of the plurality of mappings maps a respective vehicle alert to a respective subset of the plurality of haptic feedback sensors; and
activating, using the at least one processor, the subset of the plurality of haptic feedback sensors based at least in part on the mapping.

2. The method of claim 1, wherein activating the subset of the plurality of haptic feedback sensors comprises:
activating at least one haptic feedback sensor located in at least one of a floor of the vehicle, a seat of the vehicle, a headrest of the vehicle, an armrest of the vehicle, a door of the vehicle, a steering wheel of the vehicle, a dashboard of the vehicle, a roof of the vehicle, or a console of the vehicle.

3. The method of claim 1, wherein receiving the sensor data comprises:
receiving at least one of camera data associated with a camera image sensor, lidar data associated with a lidar sensor, pressure data associated with a pressure sensor, acceleration data associated with an accelerometer, orientation data associated with a gyroscope, location data associated with a location sensor, or radar data associated with a radar sensor.

4. The method of claim 1, wherein receiving the sensor data comprises:
receiving weather sensor data associated with weather at a location of the vehicle, wherein determining the vehicle alert comprises:

determining the vehicle alert based at least in part on the weather at the location of the vehicle.

5. The method of claim 1, further comprising identifying a directional component associated with the vehicle alert, wherein activating the subset of the plurality of haptic feedback sensors comprises:
activating the subset of the plurality of haptic feedback sensors further based at least in part on the vehicle alert and the directional component associated with the vehicle alert.

6. The method of claim 1, wherein determining the vehicle alert comprises:
identifying an object in an environment of the vehicles; and
determining the vehicle alert based at least in part on the object.

7. The method of claim 1, wherein determining the vehicle alert further comprises:
identifying an object in an environment of the vehicle;
identifying an object type of the object and a location of the object relative to the vehicle, wherein the object type of the object comprises at least one of a pedestrian, another vehicle, an animal, or a landmark; and
determining the vehicle alert based at least in part on the object, the object type of the object, and the location of the object.

8. The method of claim 1, wherein determining the vehicle alert comprises:
determining at least one of a state of a speed of the vehicle, a state of a windshield wiper of the vehicle, a state of a light of the vehicle, or a state of a sensor of the vehicle.

9. The method of claim 1, wherein determining the vehicle alert comprises:
determining a determined location of the vehicle satisfies a threshold distance relative to a destination location; and
determining the vehicle alert based at least in part on determining the determined location of the vehicle satisfies the threshold distance relative to the destination location.

10. The method of claim 1, further comprising:
identifying a plurality of vehicle alerts, wherein the plurality of vehicle alerts comprises the vehicle alert;
identifying the plurality of haptic feedback sensors; and
generating the plurality of mappings based at least in part on the plurality of vehicle alerts and the plurality of haptic feedback sensors.

11. The method of claim 1, wherein identifying the mapping comprises:
obtaining an alert-sensor mapping from a computing device associated with the passenger.

12. The method of claim 1, wherein receiving the sensor data comprises:
receiving first sensor data,
wherein determining the vehicle alert comprises:
determining a first vehicle alert,
wherein identifying the mapping comprises:
identifying a first mapping,
wherein activating the subset of the plurality of haptic feedback sensors comprises:
activating a first subset of the plurality of haptic feedback sensors,
the method further comprising:
receiving second sensor data associated with the vehicle;
determining a second vehicle alert for the passenger based at least in part on the second sensor data;
identifying, from the plurality of mappings, a second mapping of the second vehicle alert to a second subset of a plurality of haptic feedback sensors; and
activating the second subset of the plurality of haptic feedback sensors based at least in part on the second mapping.

13. The method of claim 12, wherein identifying the mapping comprises:
identifying a first mapping,
the method further comprising:
identifying a second mapping of the vehicle alert to at least one of audio data or video data; and
causing a computing device to output the at least one of the audio data or the video data based at least in part on the second mapping.

14. The method of claim 1, wherein identifying the mapping comprises:
identifying a first mapping of the vehicle alert to a first subset of the plurality of haptic feedback sensors,
the method further comprising:
identifying a second mapping of the vehicle alert to a second subset of the plurality of haptic feedback sensors, the second subset of the plurality of haptic feedback sensors comprising one or more haptic feedback sensors of a user computing device; and
activating the second subset of the plurality of haptic feedback sensors based at least in part on the second mapping.

15. The method of claim 1, wherein activating the subset of the plurality of haptic feedback sensors comprises:
communicating the mapping to a computing device associated with the passenger, wherein the computing device activates the subset of the plurality of haptic feedback sensors, wherein the subset of the plurality of haptic feedback sensors forms part of the computing device.

16. The method of claim 1, further comprising:
receiving weight data associated with a pressure sensor of the vehicle;
determining a location of the passenger based at least in part on the weight data; and
identifying the plurality of haptic feedback sensors based at least in part on the location of the passenger, wherein the plurality of haptic feedback sensors are located at the location of the passenger,
wherein activating the subset of the plurality of haptic feedback sensors comprises:
activating the subset of the plurality of haptic feedback sensors further based at least in part on the location of the passenger.

17. The method of claim 1, further comprising:
receiving weight data associated with a pressure sensor of the vehicle;
determining a location of the passenger based at least in part on the weight data; and
identifying a passenger type of the passenger based at least in part on the weight data,
wherein determining the vehicle alert comprises:
determining the vehicle alert based at least in part on the location of the passenger and the passenger type of the passenger,
wherein activating the subset of the plurality of haptic feedback sensors comprises:
activating the subset of the plurality of haptic feedback sensors further based at least in part on the location of the passenger.

18. The method of claim 17, wherein identifying the passenger type of the passenger comprises:
identifying the passenger as at least one of a human or an animal, wherein a vehicle alert for the human is different than a vehicle alert for the animal.

19. A system, comprising:
at least one processor, and
at least one non-transitory storage media storing instructions that, when executed by the at least one processor, cause the at least one processor to:
receive sensor data associated with a vehicle;
determine a vehicle alert for a passenger of the vehicle based at least in part on the sensor data;
identify, from a plurality of mappings, a mapping of the vehicle alert to a subset of a plurality of haptic feedback sensors, wherein each of the plurality of mappings maps a respective vehicle alert to a respective subset of the plurality of haptic feedback sensors; and
activate the subset of the plurality of haptic feedback sensors based at least in part on the mapping.

20. At least one non-transitory storage media storing instructions that, when executed by a computing system comprising a processor, cause the computing system to:
receive sensor data associated with a vehicle;
determine a vehicle alert for a passenger of the vehicle based at least in part on the sensor data;
identify, from a plurality of mappings, a mapping of the vehicle alert to a subset of a plurality of haptic feedback sensors, wherein each of the plurality of mappings maps a respective vehicle alert to a respective subset of the plurality of haptic feedback sensors; and
activate the subset of the plurality of haptic feedback sensors based at least in part on the mapping.

* * * * *